(12) United States Patent
Brooks et al.

(10) Patent No.: US 12,122,725 B2
(45) Date of Patent: Oct. 22, 2024

(54) PROCESS FOR PRODUCING A BINDER

(71) Applicant: ARDEX Group GmbH, Witten (DE)

(72) Inventors: Stephen Alan Brooks, Suffolk (GB); Rüdiger Oberste-Padtberg, Wuppertal (DE); Jörg Sieksmeier, Essen (DE); Hubert Motzet, Rosendahl (DE); Michael Pomberg, Dortmund (DE)

(73) Assignee: ARDEX Group GmbH, Witten (DE)

( * ) Notice: Subject to any disclaimer, the term of this patent is extended or adjusted under 35 U.S.C. 154(b) by 243 days.

(21) Appl. No.: 17/612,789

(22) PCT Filed: Dec. 11, 2020

(86) PCT No.: PCT/EP2020/085745
§ 371 (c)(1),
(2) Date: Nov. 19, 2021

(87) PCT Pub. No.: WO2021/180351
PCT Pub. Date: Sep. 16, 2021

(65) Prior Publication Data
US 2022/0298068 A1    Sep. 22, 2022

(30) Foreign Application Priority Data

Mar. 13, 2020 (GB) ..................... 2003674

(51) Int. Cl.
| | | |
|---|---|---|
| *C04B 7/32* | (2006.01) | |
| *C01F 7/46* | (2006.01) | |
| *C02F 1/00* | (2023.01) | |
| *C02F 11/08* | (2006.01) | |
| *C02F 11/123* | (2019.01) | |
| *C02F 11/13* | (2019.01) | |
| *C04B 7/02* | (2006.01) | |
| *C04B 7/24* | (2006.01) | |
| *C04B 7/40* | (2006.01) | |
| *C04B 7/43* | (2006.01) | |
| *C04B 7/44* | (2006.01) | |
| *C04B 7/51* | (2006.01) | |

(Continued)

(52) U.S. Cl.
CPC ............... *C04B 7/323* (2013.01); *C01F 7/46* (2013.01); *C02F 1/008* (2013.01); *C02F 11/08* (2013.01); *C02F 11/123* (2013.01); *C02F 11/13* (2019.01); *C04B 7/02* (2013.01); *C04B 7/24* (2013.01); *C04B 7/32* (2013.01); *C04B 7/40* (2013.01); *C04B 7/434* (2013.01); *C04B 7/4423* (2013.01); *C04B 7/51* (2013.01); *C04B 7/52* (2013.01); *C04B 7/525* (2013.01); *C04B 14/06* (2013.01); *C04B 14/28* (2013.01); *C04B 24/2611* (2013.01); *C04B 24/2641* (2013.01); *C04B 28/06* (2013.01); *C04B 28/065* (2013.01); *C04B 28/14* (2013.01); *C04B 28/146* (2013.01); *C04B 28/147* (2013.01); *F23G 5/0273* (2013.01); *F27B 7/08* (2013.01); *F27B 7/36* (2013.01); *C01P 2002/72* (2013.01); *C02F 2101/10* (2013.01); *C02F 2209/02* (2013.01); *C04B 2111/00637* (2013.01); *C04B 2111/00646* (2013.01); *C04B 2111/60* (2013.01); *F23G 2201/20* (2013.01)

(58) Field of Classification Search
CPC .. C04B 7/323; C04B 7/02; C04B 7/24; C04B 7/32; C04B 7/40; C04B 7/434; C04B 7/4423; C04B 7/51; C04B 7/52; C04B 7/525; C04B 14/06; C04B 14/28; C04B 24/2611; C04B 24/2641; C04B 28/06; C04B 28/065; C04B 28/14; C04B 28/146; C04B 28/147; C04B 2111/00637; C04B 2111/00646; C04B 2111/60; C04B 28/16; C04B 28/04; C04B 2103/0068; C04B 22/064; C04B 22/143; C01F 7/46; C02F 1/008; C02F 11/08; C02F 11/123; C02F 11/13; C02F 2101/10; C02F 2209/02; C02F 11/06; C02F 11/145; F23G 5/0273; F23G 2201/20; F27B 7/08; F27B 7/36; F27B 2007/005; C01P 2002/72; Y02P 40/121; Y02P 40/125; Y02P 40/10; Y02W 10/37; Y02W 10/40; Y02W 30/91
See application file for complete search history.

(56) References Cited

U.S. PATENT DOCUMENTS

| | | |
|---|---|---|
| 4,352,660 A | 10/1982 | Steiner et al. |
| 4,671,497 A | 6/1987 | Schmitz et al. |

(Continued)

FOREIGN PATENT DOCUMENTS

| | | | |
|---|---|---|---|
| CN | 1557714 A | * | 12/2004 |
| CN | 1705622 A | | 12/2005 |

(Continued)

OTHER PUBLICATIONS

Machine Translation of Korea Patent Specification No. KR20110091171A (Year: 2011).*

(Continued)

*Primary Examiner* — Anthony J Green
(74) *Attorney, Agent, or Firm* — Todd Esker; Bret E. Field; Bozicevic, Field & Francis LLP

(57) ABSTRACT

The invention relates to a method of producing a binder comprising the steps of preparing (20) a residual material comprising amorphous alumina-rich and/or aluminium hydroxide-rich constituents, heating (30) the residual material to produce a fired material, the heating (30) of the residual material being at a temperature of >800° C.

15 Claims, 5 Drawing Sheets

Figure 1:
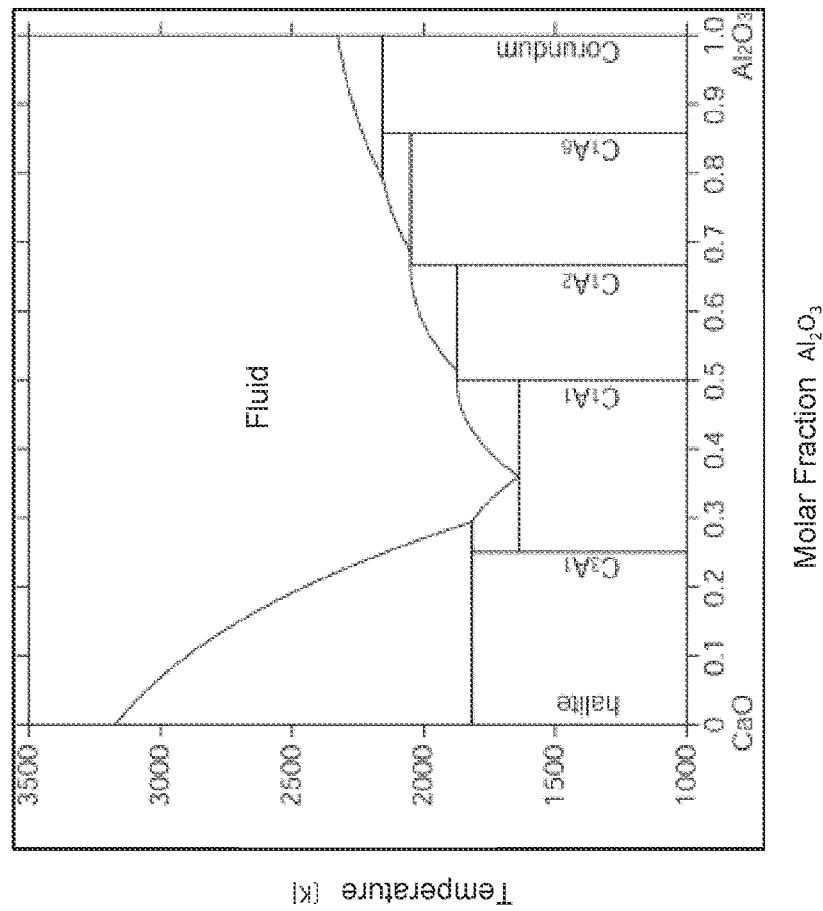

(51) Int. Cl.

| | | |
|---|---|---|
| C04B 7/52 | (2006.01) | |
| C04B 14/06 | (2006.01) | |
| C04B 14/28 | (2006.01) | |
| C04B 24/26 | (2006.01) | |
| C04B 28/06 | (2006.01) | |
| C04B 28/14 | (2006.01) | |
| F23G 5/027 | (2006.01) | |
| F27B 7/08 | (2006.01) | |
| F27B 7/36 | (2006.01) | |
| C02F 101/10 | (2006.01) | |
| C04B 111/00 | (2006.01) | |
| C04B 111/60 | (2006.01) | |

(56) References Cited

U.S. PATENT DOCUMENTS

| | | | |
|---|---|---|---|
| 2006/0048684 | A1 | 3/2006 | Bonetto et al. |
| 2007/0193477 | A1 | 8/2007 | Sawaki et al. |

FOREIGN PATENT DOCUMENTS

| | | | |
|---|---|---|---|
| CN | 1926074 | A | 3/2007 |
| CN | 1966449 | A | 5/2007 |
| CN | 105392754 | A | 3/2016 |
| EP | 3505239 | A1 | 7/2017 |
| EP | 3983359 | A1 | 4/2022 |
| GB | 2401104 | A | 11/2004 |
| GB | 2401104 | B | 8/2007 |
| GB | 2586951 | A | 3/2021 |
| JP | S62-91300 | A | 4/1987 |
| JP | S63-95114 | A | 4/1988 |
| JP | H5-310453 | A | 11/1993 |
| JP | H6-15297 | A | 1/1994 |
| JP | H11-314098 | A | 11/1999 |
| JP | 2005-75712 | A | 3/2005 |
| JP | 2006-193387 | A | 7/2006 |
| KR | 2011-0091171 | A | 8/2011 |
| PT | 104535 | B | 7/2011 |
| RU | 2219129 | C2 | 12/2003 |
| RU | 2255916 | C1 | 7/2005 |
| RU | 2368578 | C1 | 9/2009 |
| RU | 2442759 | C2 | 2/2012 |
| RU | 2607632 | C2 | 1/2017 |
| SU | 1604772 | A1 | 11/1990 |
| WO | WO8804285 | A1 | 6/1988 |
| WO | WO9626900 | A1 | 9/1996 |
| WO | WO2019092360 | A1 | 5/2019 |
| WO | WO2020249739 | A1 | 12/2020 |

OTHER PUBLICATIONS

Office Action for Russian Application No. 2021134155/03 mailed on Aug. 30, 2023, with its English Translation, 12 pages.
Search Report for Russian Application No. 2021134155/03 mailed on Aug. 30, 2023, with its English Translation, 4 pages.
Dahhou et al., Alumina sludge's Influence on the physicochemical characteristics of CPJ55 cement, MATEC Web of Conferences 149, 01058 (2018), 5 pages.
First Office Action for Chinese Application No. 202080039362.5 mailed Aug. 15, 2022, with its English translation, 25 pages.
Guo et al., Mineral Formation Mechanism of Calcium Sulphoaluminate Cement Clinker in Hydrothermal-Low Temperature Sintering Process, Journal of the Chinese Ceramic Society, Feb. 2018, vol. 46, No. 2; Abstract Only, 6 pages.
Office Action for European Application No. 20839233.2 mailed on Oct. 5, 2023, with its English Translation, 8 pages.
Office Action for China Application No. 202080039362.5 mailed on Apr. 29, 2023, English translation enclosed, 18 pages.
Examination Report for GB Application No. 1908383.1 mailed Feb. 10, 2023.
Second Office Action for Chinese Application No. 202080038955.X mailed on Feb. 19, 2023, with its English translation, 26 pages.
Office Action for European Application No. 20732860.0 mailed on Feb. 20, 2023, with its English translation, 10 pages.
Zou, Technology and Principles of Materialized Utilization of Sludge, Heilongjiang University Press, May 2015, pp. 135-138.
Xu, Corundum Refractories, 2nd edition, Metallurgical Industry Press, Jun. 2007, pp. 283-285.
Rejection of the Decision for Chinese Application No. 202080038955.X mailed on Aug. 15, 2023 with its English Translation, 18 pages.
First Office Action for Chinese Application No. 202080039721.7 mailed Aug. 2, 2022, with its English summary, 12 pages.
Office Action for Indonesian Application No. P00202110555 mailed on Aug. 2, 2023, with its English translation, 6 pages.
Office Action for Indonesian Application No. P00202110524 mailed on Aug. 4, 2023, with its English translation, 6 pages.
Office Action for Russian Application No. 2021134521/03 mailed on Jul. 11, 2023, with English translation, 16 pages.
Search Report for Russian Application No. 2021134521/03 mailed on Jul. 10, 2023, with English translation, 4 pages.
Office Action for India Application No. 202147057863 mailed on Dec. 19, 2023, 6 pages.
Office Action for Indonesia Application No. P00202110468 mailed on Jul. 11, 2023, with English translation, 5 pages.
Office Action for India Application No. 202147055857 mailed on Jul. 21, 2023, 6 pages.
Office Action for Russia Application No. 2021134694/03 mailed on Jun. 21, 2023, with English translation, 10 pages.
Search Report for Russia Application No. 2021134694/03 mailed on Jun. 20, 2023, with English translation, 4 pages.
Chen et al., Reuse of water purification sludge as raw material in cement production, Cement & Concrete Composites 32 (2010) 436-439.
Examination Report for GB Application No. 2003674.5 mailed Oct. 28, 2022, 3 pages.
Substantive Examination Adverse Report for Malaysian Application No. PI2021006975 mailed on Dec. 14, 2023, 3 pages.
Second Office Action for China Application No. 202080039721.7 mailed on May 11, 2023, English translation, 25 pages.
Office Action for United Kingdom Application No. GB1908383.1 mailed on May 25, 2023, 3 pages.
Dahhou et al., Alumina sludge's Influence on the physicochemical characteristics of CPJ55 cement, MATEC Web of Conferences 149, 01058, Jan. 2018.
First Office Action for Chinese Application No. 202080038955.X mailed Aug. 9, 2022, with its English summary, 16 pages.
Office Action for GB Application No. GB1908383.1 mailed Jun. 8, 2022, 5 pages.
Office Action for European Application No. 20732866.7 mailed on Feb. 20, 2023, 4 pages.
Office Action for European Application No. 20732865.9 mailed on Feb. 22, 2023, 5 pages.
Ahmad et al., Investigating calcined filter backwash solids as supplementary cementitious material for recycling in construction practices, Construction and Building Materials, vol. 175, Jun. 30, 2018, p. 664-671.
First Office Action for Chinese Application No. 202080039062.7 mailed on Sep. 15, 2023, with its English Translation, 26 pages.
Examination Report for GB Application No. 1908383.1 mailed on Sep. 22, 2023, 2 pages.
Examination Report for Indian Application No. 202147053288 mailed on Sep. 22, 2023, 7 pages.
Decision of Final Rejection for Chinese Application No. 202080039721.7 mailed on Sep. 28, 2023, with its English Translation, 29 pages.
Office Action for Indonesian Application No. P00202110077 mailed on Aug. 22, 2023, with its English Translation, 6 pages.
Office Action for Canada Application No. 3,140,133 mailed on Nov. 23, 2023, 5 pages.
Written Opinion for Singapore Application No. 11202113039U mailed on Nov. 24, 2023, 6 pages.

(56) References Cited

OTHER PUBLICATIONS

Substantive Examination for Russia Application No. 2021134521/03(072949) mailed on Dec. 6, 2023, with its English Translation, 8 pages.
Office Action for Canada Application No. 3,140,520 mailed on Dec. 1, 2023, 4 pages.
Office Action for Canadian Patent Application No. 3,141,434, mailed Jan. 12, 2024, 6 pages.
Office Action for Vietnamese Patent Application No. 1-2021-07698, mailed Jan. 31, 2024, and its English translation, 4 pages.
Office Action for Vietnamese Patent Application No. 1-2021-07697, mailed Jan. 31, 2024, and its English translation, 4 pages.
Office Action for Canada Application No. 3,141,396 mailed on Dec. 4, 2023, 5 pages.
Office Action for Chinese Application No. 202080039362.5 mailed on Nov. 27, 2023, with its English Translation, 19 pages.
Written Opinion for Singapore Application No. 11202112829T mailed on Nov. 27, 2023, 5 pages.
Office Action for Russia Application No. 2021134155/03 mailed Jan. 30, 2024, with its English translation, 10 pages.
Written Opinion for Singapore Application No. 11202112832X mailed on Nov. 27, 2023, 7 pages.
Written Opinion for Singapore Application No. 11202113036W mailed on Nov. 24, 2023, 7 pages.
Office Action for Japan Patent Application No. 2021-571876, mailed Mar. 5, 2024, and its English translation, 30 pages.
Office Action for Japan Patent Application No. 2021-571881, mailed Feb. 27, 2024, and its English translation, 9 pages.
Search Report for Malaysia Patent Application No. PI2021007015, mailed Apr. 18, 2024, 5 pages.
Office Action and Search Report for Russian Patent Application No. 2021134529/03(072983), mailed Apr. 18, 2024, and its English translation, 20 pages.
Volzhenskiy et al., Mineral Binding Materials, Moscow, Stroyizdat, 1979, p. 436-438, 442, and its English translation, 8 pages.
Office Action for Japanese Patent Application No. 2021-571879, mailed Mar. 28, 2024, and its English translation, 8 pages.
Yoshioka et al., Development of the Environmental Clean-Up Material from Water-Purifying Sludge, 2009, 8 pages.
Yoshioka et al., Development of the Environmental Clean-Up Material from Water-Purifying Sludge, Annual Report of the Mie Institute for Environmental Conservation, 2009, with machine translation, 17 pages.
Office Action for Chinese Patent Application No. 202080039062.7, mailed Jun. 7, 2024, and its English translation, 26 pages.
Wang, Ion Exchange Technology in Pollution Control, Compiled by C. Calmon H. Gold, Sun Fangjiu Xianghua School, Atomic Energy Press, 1979, and its English translation, 12 pages.
Zou, Material Utilization Technology and Principles of Sludge, Heilongjiang University Press, May 2015, and its English translation, 11 pages.

* cited by examiner

PROCESS FOR PRODUCING A BINDER

The present invention relates to a binder, a method for producing a binder, and the use of a binder. Furthermore, the invention relates to a construction chemical product comprising such a binder.

Driven by government investments, the construction industry has seen a steady increase in incoming orders in recent years and accounts for a significant share of the manufacturing sector. In view of the recent focus on compliance with climate policy targets, the construction industry is therefore increasingly required to pursue environmentally friendly and sustainable concepts. For this reason, the concept of sustainable construction has been established for some time, which pursues various approaches to carrying out construction measures while preserving the ecosystem and the environment.

With regard to possible starting points, the factors that drive climate change most strongly are of particular interest. In addition to the necessarily high demand for fossil fuels in the construction industry, it is above all the high demand for building materials that significantly promotes climate change. In contrast to methods for reducing the demand for fossil fuels, the development of sustainable building materials still needs to be developed. For example, the production of currently known binders is often still associated with a considerable use of natural resources and a high energy input.

It is therefore the object of the present invention to at least partially eliminate the above-mentioned disadvantages of known binders or construction chemical products. In particular, it is the object of the invention to provide a binder or construction chemical product that meets the highest requirements for sustainability and environmental friendliness and yet is versatile and easy and inexpensive to produce.

The foregoing object is solved by a method having the features of the independent method claim, a binder or construction chemical product having the features of the independent substance claim, and a use having features of the independent use claim. Further features and details of the invention are apparent from the respective dependent claims, the description and the drawings. Features and details described in connection with the binder or construction chemical product according to the invention naturally also apply in connection with the method according to the invention and the use according to the invention, and vice versa, so that reference is or can always be made mutually with respect to the disclosure of the individual aspects of the invention.

According to the invention, a method for producing a binder is provided. Here, the method according to the invention comprises the steps of preparing a residual material comprising amorphous alumina-containing and/or aluminium hydroxide-containing components and heating the residual material to produce a fired material, wherein the heating of the residual material is carried out at a temperature of >800° C.

A binder according to the invention can then be used in particular in construction-chemical products, such as screeds, filling compounds, tile adhesives, levelling compounds, mortars, joint mortars or plasters or the like, which can then in turn be used, for example, for laying natural stones, factory stones, tiles, slabs or the like.

In the context of the invention, a binder can preferably be understood as a material which can be used as a hardening element in construction chemical products. After mixing with water, binders according to the invention can harden or solidify independently, preferably as a result of chemical reactions with the mixing water, and remain solid and dimensionally stable after hardening. The binder according to the invention can thereby preferably be formed in the form of a hydraulic binder which remains solid and dimensionally stable after hardening, even under water. In the classical sense, binders may be understood to be, for example: Calcium aluminate cements and/or calcium sulfoaluminate cements and/or Portland cements and/or hydrated lime and/or calcium oxide and/or calcium hydroxide and/or calcium sulphate. Likewise pozzolans, lime or similar substances which can act as binders.

According to the invention, a residual material is understood in particular to be a residue produced in a process for which no reuse or only limited reuse is envisaged and which must therefore be disposed of, sometimes in a laborious and cost-intensive manner. In the context of the invention, processing can be understood in particular as a form of treatment which comprises, for example, collecting, filtering, drying, shredding or the like.

By an amorphous residual material or an amorphous material can be understood in particular a material which is present in a non-crystalline state to a proportion of at least 50 wt. %. In particular, at least 50 wt. % of the material can be X-ray amorphous, i.e. in particular at least 50 wt. % of the material does not provide sharp reflections in X-ray diffraction experiments, but only broad diffuse maxima.

The alumina-containing and/or aluminium hydroxide-containing residual material according to the invention can advantageously have an alumina or an aluminium hydroxide content (the sum of the alumina and aluminium hydroxide) of at least 5 wt. %, preferably of at least 30 wt. %, in particular of at least 50 wt. % relative to the dry content of the material or residual material. It is understood here that the material may also be formed essentially in the form of only one of the two components.

In the context of the invention, a fired material can be understood in particular as the material resulting from a thermal process, such as a firing process, which as a result of the energy input during the firing process has a changed structure, in particular a changed chemical structure, compared with its initial state. Depending on the type of thermal process carried out, fired material can also be understood as a sintered material, a carbonized material, a pyrolyzed material, a calcined material or a roasted material or the like.

It should be noted at this point in advance of the following explanations that, with regard to the indication of preferred proportions by weight of the components within a mixture, the skilled person is very well able to combine the proportions with one another in such a way that the total proportion of all components of the mixture is 100 wt. %.

Within the scope of the present invention, it has been recognized that, in particular by using a processed amorphous residual material containing aluminium oxide and/or aluminium hydroxide, a versatile binder can be produced in a simple and inexpensive manner, which at the same time makes a contribution to sustainable construction, the contribution being made in particular by the fact that natural resources are conserved by using residual or waste materials for the production of the binder, which would otherwise have to be disposed of in a time-consuming and cost-intensive manner. Furthermore, it has been recognized in the context of the invention that a temperature above 800° C. is necessary for processing.

With regard to a particularly simple, efficient and inexpensive possibility of using reprocessed amorphous alumina-containing and/or aluminum hydroxide-containing residues, it can be advantageously provided according to the invention that the residue is formed at least partially, preferably completely, in the form of water treatment residues. In a particularly preferred manner, the residual material may be formed at least partially, preferably completely, in the form of drinking water treatment residues. In this respect, drinking water treatment residues have in particular very high aluminium oxide and/or aluminium hydroxide contents and are significantly less costly to purify than other residues, such as waste water treatment residues or similar residues, in particular because they are less contaminated with pollutants. Due to the different ingredients of drinking water and wastewater, these (drinking water/wastewater) are not directly comparable. Furthermore, the residue can preferably be formed in a sludge-like manner, for example in the form of a drinking water treatment sludge.

With regard to the production of a fast-setting binder with high water retention capacity, it may advantageously be provided that the amorphous alumina-containing and/or alumina-hydroxide-containing residue has an X-ray amorphous fraction of more than 80 wt. %, preferably of more than 85 wt. %, in particular of more than 90%. Thus, advantageously, the amorphous residue has crystalline fractions detectable via X-ray diffraction experiments to less than 20 wt. %, preferably to less than 15 wt. %, in particular to less than 10 wt. %. X-ray diffraction experiments for determining the amorphous fraction of the residual material can be carried out, for example, in accordance with DIN EN 13925-1.

With regard to the simple and exact adjustment of predetermined mixture ratios, it may also be advantageous if the preparation of the residual material comprises the removal of water, the removal of the water preferably being effected by means of a heating and/or a mechanical dewatering process or, preferably, by means of a simple stockpiling of the residual material. In the case of a dried product, the determination of the proportion of the component concerned for the production of a predetermined mixture is considerably more exact and easier to carry out, because the exact proportion of water does not have to be calculated out or is negligible.

With regard to a simplified use in subsequent production processes for the production of binders, it can also be advantageously provided that the preparation of the residual material comprises shredding wherein the amorphous residual material containing aluminium oxide and/or aluminium hydroxide is preferably shredded to a particle size of less than 100 μm, particularly preferably to a particle size of less than 50 μm, in particular to a particle size of less than 40 μm.

With regard to a particularly energy-saving manufacturing process, it can also be provided that the residual material is processed in such a way that a residual content of organic material remains in the amorphous alumina-containing and/ or aluminium hydroxide-containing residual material as a fuel source. Accordingly, the organic material can act as a fuel during subsequent heating, thus saving energy and resources. Preferably, an organic material is herein understood to mean a material comprising carbon compounds and not belonging to any of the following types of compounds: anhydrous chalcogenides, carbonic acid, carbonates, carbides, cyanides, cyanates and thiocyanates.

Since the amorphous alumina-containing and/or alumina-hydroxide-containing residual material may contain undesirable microorganisms, it may further be advantageously provided according to the invention that the processing of the residual material comprises a removal of microorganisms, wherein the removal of the microorganisms may preferably comprise a thermal treatment and/or a drying.

With regard to a further variation of the properties of the binder, it can further be provided according to the invention that a calcium ion source is additionally added prior to heating the residual material for producing a material mixture. According to the invention, a calcium ion source can be understood in particular as a substance or mixture of substances which can release calcium ions. Exemplary calcium ion sources are CaO, $Ca(OH)_2$ and $CaCO_3$. Advantageously, $Ca(OH)_2$ from residual and waste material sources can be used.

Likewise, in order to further vary the properties of the binder, it may be provided that a sulfate ion source is additionally added prior to heating the residual material in order to produce a material mixture. According to the invention, a sulfate ion source can be understood in particular as a substance or mixture of substances which can release sulfate ions. As a sulfate ion source, calcium sulfate-α-hemihydrate, calcium sulfate-β-hemihydrate, anhydrite, calcium sulfate dihydrate or mixtures thereof may be mentioned by way of example. Advantageously, $CaSO_4$ from residual and waste material sources, such as FGD gypsum, can be used here.

In the context of the most purposefully controllable production of a binder that is as versatile as possible, it can be advantageously provided that the substances:
1) of a residual material,
2) a source of calcium ions as described above, and
3) a source of sulphate ions as described above
be presented in the following weight ratios:
Component 1 at 10.0-100.0 wt. %, component 2 at 0.0-90.0 wt. % and component 3 at 0.0-90.0 wt. % based on the dry content of the sum of the weight of components 1, 2 and 3.

With regard to the most energy- and resource-saving production possible of a binder, it can also be provided that water is added to form hydrate-phase-containing intermediates before the residual material is heated and/or before the material mixture is heated. By forming hydrate phase-containing intermediates, it is possible to significantly reduce the necessary production temperature for a binder compared to conventional production temperatures for binders. According to the knowledge of the invention, the addition of water for the formation of hydrates provided in the present invention is particularly responsible for this. This aspect reduces the necessary energy input.

Intermediates containing hydrate phases can be described as intermediates obtained by presenting a mixture of:
1) a processed amorphous alumina-containing and/or aluminium hydroxide-containing residue materials,
2) if necessary, additionally a calcium ion source,
3) if necessary, additionally a sulphate ion source
and subsequent addition of water. Hydrate phase-containing intermediates may be formed in particular in the form of calcium aluminate hydrates and/or calcium sulfoaluminate hydrates or mixtures thereof.

Thus, within the scope of the invention, various binders or mixtures of materials can be prepared prior to heating. Thus, according to the invention, a calcium ion source and/or a sulfate ion source can be added in addition to an amorphous residual material rich in aluminum oxide and/or aluminum hydroxide for the preparation of the binder.

The addition of the calcium ion source and/or the sulphate ion source can in this case preferably take place before the addition of water for the formation of advantageous hydrate phase intermediates, so that before the addition of the water a mixture of:
1) Processed amorphous alumina-containing and/or alumina-hydroxide-containing residual material
2) if necessary additionally a calcium ion source
3) if necessary additionally a sulphate ion source
can be prepared.

Water may then be added to the residual material or mixture of residual material and/or a calcium ion source and/or a sulfate ion source to form a hydrate phase intermediate. The resulting mixture may thereby be blended and homogenized together by suitable methods. Advantageously, the resulting mixture may be allowed a reaction time of at least 30 minutes, preferably at least 12 hours, more preferably at least 24 hours. In this way, it can be ensured that a reaction equilibrium can be formed which is free of crystalline $Ca(OH)_2$ or CaO.

With regard to a particularly energy-saving manufacturing process, it may further be provided that additionally a processing of the hydrate phase-containing intermediates is provided, wherein the processing preferably comprises a drying. Drying the hydrate phase-containing intermediates also has an energy-saving effect on a downstream firing process and simplifies a downstream shredding process of the hydrate phase-containing intermediates.

With regard to simplified use in subsequent production processes for binder production, it can also be provided in an objectively advantageous manner that the preparation of the hydrate phase-containing intermediate products comprises comminution, wherein the amorphous alumina-containing and/or aluminum hydroxide-containing residual material is preferably shredded to a particle size of less than 100 μm, particularly preferably to a particle size of less than 50 μm, in particular to a particle size of less than 40 μm.

Likewise, within the scope of the invention, a compacting of the residual material and/or of the mixture of materials and/or of the intermediate products hydrate phase-containing may be provided for minimizing the proportion of fine material, wherein the compacting may preferably comprise a briquetting for producing briquettes and/or a pelletizing for producing pellets and/or a granulating for producing granules and/or a pressing for producing pressed bodies. In particular, such compaction or compacting may serve the purpose of a simple and as complete as possible introduction of the residual material and/or the mixture of materials and/or the intermediate products hydrate phase-containing into a furnace. Likewise, such a process may be advantageous to ensure sufficient contact points for sintering or the like prior to a heating process, for example.

Common aluminate-containing binders (e.g. calcium aluminate cements) used in construction chemistry require energy-intensive production and are typically fired at temperatures of >1,400° C. Calcium sulfoaluminate-containing binders are typically fired at temperatures of >1250° C. For these binders, too, the necessary production temperature can be significantly reduced in the sense of the invention compared to the prior art.

By using the method according to the invention, it is possible to significantly reduce the necessary production temperature for aluminate-containing binders compared to the manufacturing processes known from the prior art. According to the findings of the invention, this is due in particular to the upstream formation of hydrates, which significantly reduces the firing temperature required to produce the binder in contrast to known firing temperatures.

In accordance with the invention, aluminate-containing binders, preferably calcium aluminate-containing binders or calcium sulfoaluminate-containing binders, can be prepared at temperatures significantly below the usual temperatures. These binders can subsequently be used in construction chemical products. In the course of the invention, it has been recognized that when the binders according to the invention are used in construction chemical products, the processing time of the construction chemical products depends on the firing temperature during the production of the binders used. In the course of the invention, it was therefore necessary to find an optimum firing temperature which, on the one hand, should be as low as possible from the point of view of environmental protection and, on the other hand, is high enough to be able to produce binders which, when used in construction chemical products, allow practicable processing times.

In the context of the invention, it has been recognized that by means of the processing steps provided according to the invention, in particular at a temperature between 800° C. and 1700° C., a particularly advantageous compromise can be achieved between a practicable processing time when used in a construction chemical product and energy-saving production. The heating of the residual material and/or the material mixture and/or the hydrate phase-containing intermediate products should be carried out at a temperature of >800° C., preferably at a temperature between 900° C. and 1150° C., particularly preferably at a temperature between 950° C. and 1050° C., especially at a temperature of 980° C.

Advantageously, the heating can be carried out in a rotary (tubular) kiln and/or in a melting furnace and/or in an electric arc furnace and/or in a tub shaft kiln and/or in a fluid bed thermal calciner or the like.

Finally, in order to improve the usability of the binder produced in accordance with the invention, a preparation of the fired material may be provided, wherein the preparation may comprise a shredding, wherein the binder may preferably be shredded to a particle size of less than 100 μm, particularly preferably to a particle size of less than 50 μm, in particular to a particle size of less than 40 μm.

According to the invention, a preparation of the fired material may further advantageously comprise the addition of additives, such as grinding aids, aging inhibitors and/or anti-dusting agents.

It is also an object of the invention to provide a binder, in particular produced by a method described above. Here, the binder in question comprises aluminates and/or calcium aluminates and/or calcium sulfoaluminates. Thus, the binder brings the same advantages as have already been described in detail with respect to the method according to the invention.

The possible resulting fired binders may hereafter comprise, among others, the mineral phases CA and/or $CA_2$ and/or $CA_3$ and/or $C_{12}A7$ and/or CSA, in particular Ye'elimit in different proportions, depending on the raw material used. A particular advantage of the present invention is that the ratio of the resulting main mineral phases within the resulting binder can be easily and flexibly determined by the mixing ratio of the three main components
1) Processed residual material containing aluminium oxide and/or aluminium hydroxide
2) if necessary, additional addition of a calcium ion source
3) if necessary, additional addition of a sulphate ion source
can be adjusted. With regard to the designation of the mineral phases, according to the IUPAC nomenclature of cement terminology, under C: CaO, under A: $Al_2O_3$ and under S: $SO_3$ is understood.

In the context of the highest possible cost savings and sustainability, it can be advantageously provided in accordance with the invention that the $Al_2O_3$ from the prepared alumina-containing and/or aluminum hydroxide-containing residual material is present in a proportion of more than 50 mol %, preferably in a proportion of more than 55 mol %, in particular in a proportion of more than 65 mol %, based on the total mass of the binder.

It is also an object of the invention to use a binder described above for the production of a construction chemical product, preferably a screed, a filling compound, a tile adhesive, a levelling compound, a mortar, a grout or a plaster. Thus, the use according to the invention brings the same advantages as have already been described in detail with respect to the method according to the invention or the binder according to the invention. If binders are produced in accordance with the invention and used in construction chemical products, they have a particularly practicable processing time.

In the context of the invention, a construction chemical product can preferably be understood as a dry mixture of various functional substances comprising binders, filling compounds and functional additives, in order to obtain a product which can perform construction chemical tasks tailored to construction sites. By way of example, a screed, a filler, a tile adhesive, a levelling compound and/or a mortar for laying natural stones, ashlars, tiles or slabs may be mentioned.

It is understood that the construction chemical products which can be produced with the aid of the binders in question can also be suitable for laying other covering materials, such as mats, wooden flooring, parquet, carpet, laminate and the like, in addition to laying natural stone, ashlar, tiles or slabs. The screed in question can also be a flowing or dry screed. The present mortar may also be in the form of a grout or thin bed mortar. The filling compound may, for example, be formed in the form of a floor, wall or ceiling filler, whereas the tile adhesive may also be formed as a floor or wall tile adhesive.

Also an object of the invention is further a construction chemical product comprising a binder described above, wherein the binder is present in the construction chemical product in a proportion of 0.1 wt. %-80 wt. %, preferably in a proportion of 1 wt. %-50 wt. %, particularly preferably in a proportion of 5 wt. %-30 wt. %, wherein the construction chemical product additionally comprises filling compounds and/or additives. Filling compounds may be understood, for example, as sands, chalks and light fillers or the like. Additives may be understood to be, for example, superplasticizers and/or thickeners and/or pigments and/or colour pigments and/or defoamers and/or stabilizers and/or hardening retarders and/or plastic fibers or the like. Thus, the construction chemical product according to the invention brings the same advantages as have already been described in detail with respect to the method for producing a construction chemical product according to the invention.

In particular, the construction chemical product can be designed in such a way that the amount of heat released by the mixture of water and construction chemical product after it has been mixed with water reaches an absolute maximum over time, the absolute maximum preferably being more than 20 minutes, more preferably more than 45 minutes, in particular more than 60 minutes.

Further advantages, features and details of the invention will be apparent from the following description, in which embodiments of the invention are described in detail with partial reference to the drawings. The features mentioned in the claims and in the description may be essential to the invention individually or in any combination.

Figure 2A:
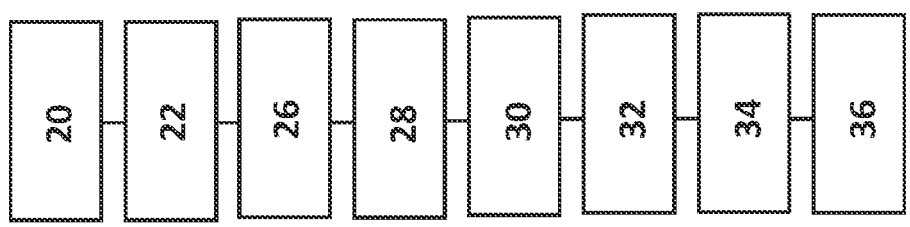
Figure 2B:
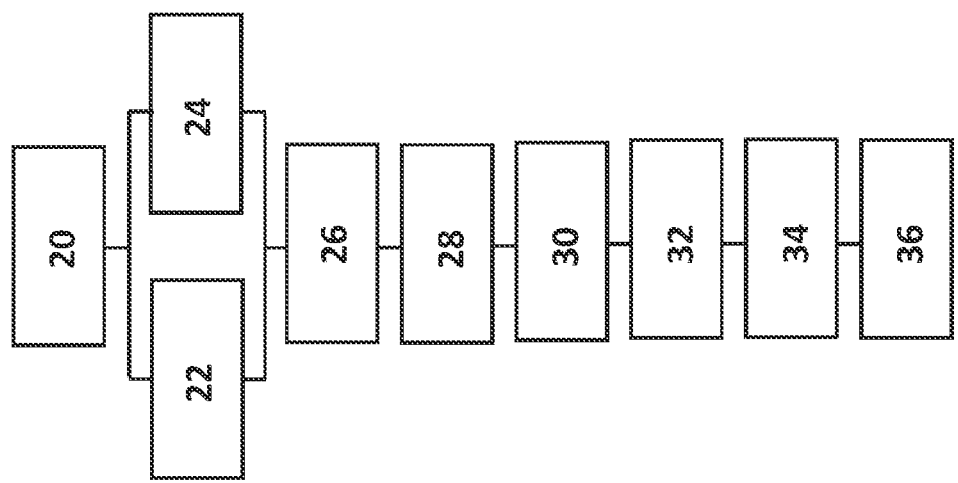
Figure 2C:
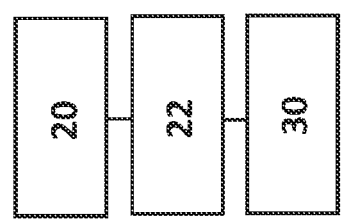
Figure 3:
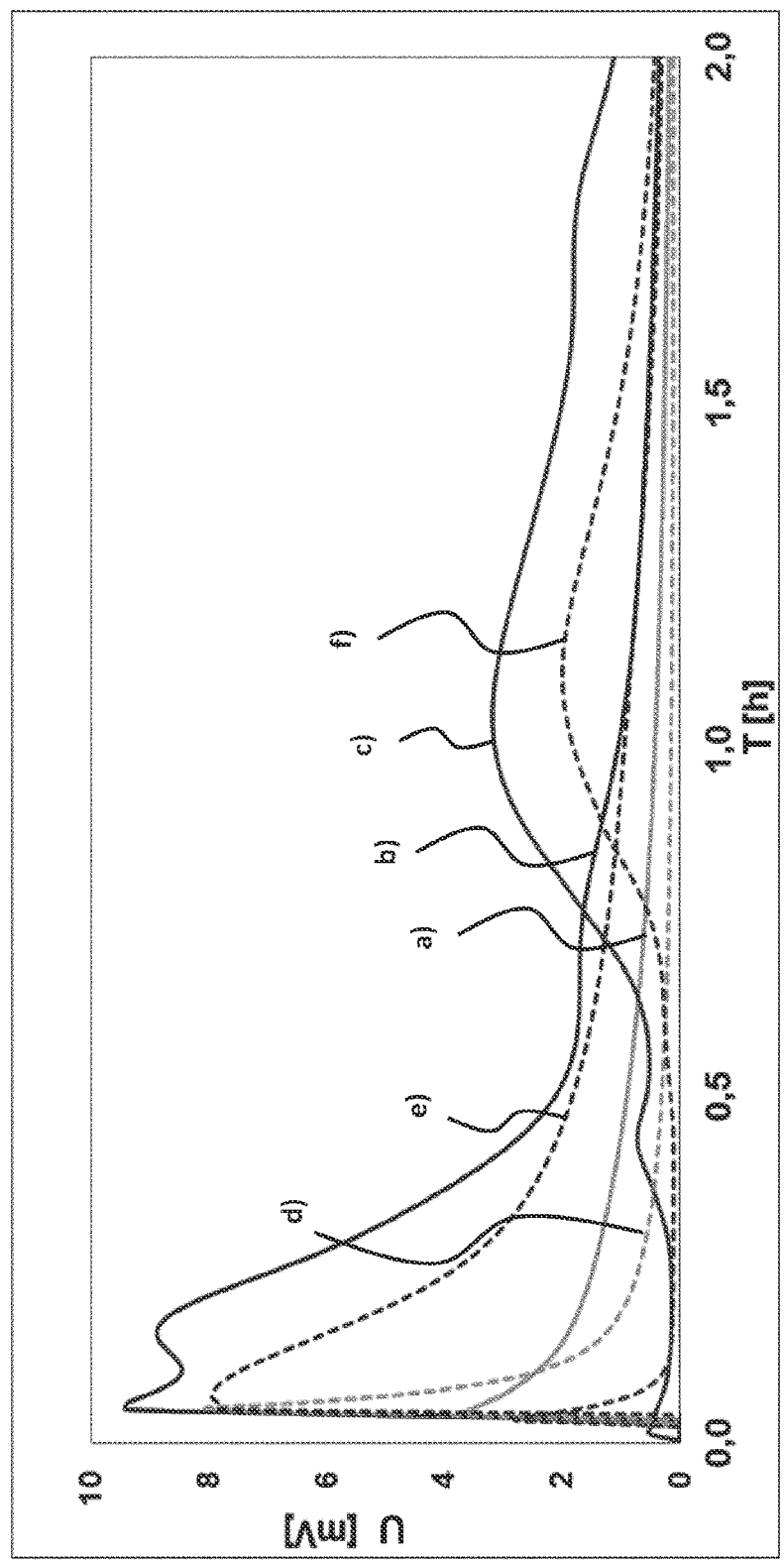

It shows:

FIG. 1 a schematic representation of a phase diagram of exemplary phases of a calcium aluminate cement, FIG. 2a a schematic representation of the individual steps of a process according to the invention for producing a binder according to a first embodiment, FIG. 2b a schematic representation of the individual steps of a method according to the invention for producing a binder according to a second embodiment, FIG. 2c a schematic representation of the individual steps of a process according to the invention for producing a binder according to a third embodiment, FIG. 3 a schematic representation of various heat calorimetric measurements a to f.

FIG. 1 shows a schematic representation of a phase diagram of exemplary phases of a calcium aluminate cement. For the production of calcium aluminate cements, the raw materials used must be brought to temperatures close to the necessary solid/liquid phase transition, which, as can be seen from FIG. 1, are generally at least >1700 K (>1430° C.). By using the method according to the invention, not only can residual materials be sensibly reused, but also the necessary production temperature for the production of aluminate-containing binders can be significantly reduced. According to the findings of the invention, this is due in particular to the upstream formation of hydrates, which significantly reduces the firing temperature required to produce the binder according to the invention, in contrast to known firing temperatures.

FIG. 2a shows a schematic representation of the individual steps of a method according to the invention for producing a binder according to a first embodiment.

In this regard, the method according to the first embodiment of the invention may be particularly referred to as the calcium aluminate route and comprises the steps of preparing 20 an amorphous alumina-containing and/or aluminum hydroxide-containing residual material, adding 22 a calcium ion source, and adding 26 water to form a hydrate phase-containing intermediate. Further, according to the first embodiment, the method comprises preparing 28 the hydrate phase-containing intermediate and heating 30 the material to produce a firing material, wherein the heating of the feed material is at >800° C.

Subsequently, in the method according to the first embodiment, the heated material is further processed 32 to obtain binders before the binder can be used 34 to produce a construction chemical product and the construction chemical product can be used 36 as a screed, filling compound, tile adhesive, levelling compound or mortar.

FIG. 2b shows a schematic representation of the individual steps of a method according to the invention for producing a binder according to a second embodiment.

The process according to the second embodiment, referred to herein as the calcium sulfoaluminate route, differs from the process according to the first embodiment only in that, in addition to an addition 22 of a calcium ion source, there is an addition 24 of a sulfate ion source prior to an addition 26 of water to form a hydrate phase-containing intermediate.

FIG. 2c shows a schematic representation of the individual steps of a method according to the invention for producing a binder according to a third embodiment.

The process according to the third embodiment proceeds without addition of water and, in contrast to the embodiment according to FIGS. 2a and b, comprises only the steps of preparing 20 an amorphous alumina-containing and/or aluminum hydroxide-containing residual material, adding 22 a calcium ion source, and heating 30 the material to produce a firing material, wherein the heating of the feed material is carried out at >800° C.

FIG. 3 shows a schematic representation of various heat calorimetric measurements a) to f).

These heat calorimetric measurements show the heat development of various construction chemical products, each of which contains different binders produced according to the invention in a proportion of 20 wt. %. Two different hydrate phase-containing intermediates were used for the binder production. For the preparation of the hydrate phase-containing intermediates, according to the invention, the following were available:

1) a processed amorphous alumina-containing and/or alumina-hydroxide-containing residual material
2) a source of calcium ions
3) a source of sulphate ion source (not used here)

For (a, b, c), a molar mixing ratio of 50% 1 (based on aluminum content) and 50% 2 (based on calcium ion content) was used. These resulting binders were internally referred to as CA binders. For (d, e, f), a molar mixing ratio of 66.6% 1 (based on the aluminum content) and 33.3% 2 (based on the calcium ion content) was used. These resulting binders were internally referred to as CA2 binders. Varying firing temperatures were used in the preparation of the binders. For (a, d), 180° C. was used. For (b, e) 800° C. was used and for (c, f) 980° C. was used.

The measurements of the heat development provide indirect information about the setting behaviour of the respective binder-containing building chemical product. A fast and strong heat development (measured here in the form of the voltage in mV) corresponds to a fast setting of the binder-containing constructing chemical product.

As can be seen from the plot in FIG. 3, the construction chemical products were measured calorimetrically for 2 hours after the addition of water. As can be seen from FIG. 3, the main reaction peak, i.e. the heat generated during the setting of the building chemical products, shifts to later times the higher the firing temperature of the respective binder used.

For example, the construction chemical products (a, d), whose binders were fired at a temperature of 180° C., show a strong heat development directly after the addition of water. Such construction chemical products are difficult to use because they set and harden too quickly and do not allow the user sufficient time to bring the construction chemical product into a desired shape.

The construction chemical products containing binders fired at a firing temperature of 800° C. (b, e) show a rapid but controllable heat development. After about 5 to 10 min, a sharp peak is observed, which then flattens out considerably.

The construction chemical products containing binders fired at 980° C. (c, f), in turn, have a very practicable processing time.

The absolute maximum of the heat development, which represents a parameter that is easy to determine and yet meaningful for determining the processing time of a construction chemical product, is above 60 minutes for both construction chemical products with binders with a firing temperature of 980° C. (c, f).

At firing temperatures >800° C., it is thus possible to produce binders tailored to the firing temperature for a wide range of construction chemical products (fast-setting and slow-setting products).

Examples of Embodiments:

For the preparation of a binder according to the invention, it is first provided that, in addition to a prepared amorphous residual material containing aluminium oxide and/or aluminium hydroxide, optionally additionally a calcium ion source and/or optionally additionally a sulphate ion source is added. The optional addition of the calcium ion source and/or the sulfate ion source is thereby preferably carried out before the optional addition of water, which can advantageously be added to form hydrate phase-containing intermediates, so that before the optional addition of the water a mixture of:

1) Processed amorphous alumina-containing and/or aluminium hydroxide-containing residual material
2) if necessary, additionally a calcium ion source
3) if necessary, additionally a sulphate ion source.

By marking the addition of water to form hydrate phase-containing intermediate products as an optional step, it is understood that the subsequent. Examples of embodiments can also be produced without the addition of water, for example merely by the addition of prepared amorphous residual material containing aluminium oxide and/or aluminium hydroxide and subsequent heating at a temperature of >800° C. or by the addition of prepared amorphous residual material containing aluminium oxide and/or aluminium hydroxide, a calcium ion source and/or a sulphate ion source and subsequent heating at a temperature of >800° C.

After carrying out the method steps provided according to the invention, the possible resulting binders have, among other things, the mineral phases CA and/or $CA_2$ and/or $CA_3$ and/or $C_{12}A_7$ and/or CSA in various concentrations, depending on the raw material used. A particular advantage of the present invention is that the main mineral phases of the resulting binder can be easily and flexibly adjusted by the mixing ratio of the three components 1, 2 and 3.

Some exemplary formulations for these mixtures are given below. The ratios given are to be understood as molar ratios, based on the aluminium content in the prepared amorphous alumina-containing and/or aluminium hydroxide-containing residue (1), on the calcium content in the calcium ion source (2) and on the sulphate content in the sulphate ion source (3).

Binder Mixture 1 (CA Mixture):
1) 76.2%
2) 23.8%
3) 0.0%

Binder Mixture 2 ($CA_2$ Mixture):
1) 85.4%
2) 14.6%
3) 0.0%

Binder Mixture 3 ($C_{12}A_7$ Mixture):
1) 66.1%
2) 33.9%
3) 0.0%

Binder Mixture 4 (CSA Mixture):
1) 53.3%
2) 20.0%
3) 26.7%

Binder Mixture 5 (Pure Aluminate-Containing Binder):
1) 100%
2) 0%
3) 0%

In particular, the binders according to the invention can be prepared according to a method according to the invention by providing components (1) or mixtures of components 1, 2 and 3, optionally adding water to these components or mixtures to form hydrates, preparing these hydrates, and heating the prepared hydrates to a temperature of >800° C.

As described above, the binders of the invention can also be prepared without the addition of water to form hydrate phase intermediates.

The versatile, different binders according to the invention which can be produced by means of the mixtures listed in the embodiments are not only versatile in use and can be produced simply and inexpensively, but also at the same time make a contribution to sustainable construction, which is provided in particular by the fact that resources are conserved for the production of the hydraulic binders by using residual or waste materials for the production of the binders, which would otherwise have to be disposed of in a complex and cost-intensive manner.

LIST OF REFERENCE SIGNS

1 Residual component
2 Calcium ion source component
3 Sulphate ion source component
20 Preparation of an amorphous residual material rich in aluminium oxide and/or aluminium hydroxide
22 Adding a calcium ion source
24 Adding a sulfate ion source
26 Addition of water to form hydrate phase intermediates
28 Preparation of the intermediate products containing hydrate phases
30 Heating of the residual material/mixture of materials/prepared intermediate products containing hydrate phases
32 Preparation of the fired material
34 Use of the binder for the manufacture of a construction chemical product,
36 Use of the construction chemical product
U Voltage
mV Millivolt
T Time
h Hours
K Kelvin
C CaO
A $Al_2O_3$
S $SO_3$
a construction chemical product containing 20 wt. % of a raw material based binder, internally designated as "CA", produced at 180° C.
b construction chemical product containing 20 wt. % of a raw material based binder, internally designated "CA", prepared at 800° C.
c Construction chemical product containing 20 wt. % of a raw material based binder, internally designated "CA", prepared at 980° C.
d construction chemical product containing 20 wt. % of a raw material based binder, internally designated "$CA_2$", prepared at 180° C.
e construction chemical product containing 20 wt. % of a raw material based binder, internally designated as "$CA_2$", produced at 800° C. construction chemical product containing 20 wt. % of a raw material based binder, internally designated "$CA_2$", prepared at 980° C.

The invention claimed is:
1. A method for producing a binder comprising:
Processing of a residual material comprising amorphous alumina-rich and/or aluminium hydroxide-rich components,
Heating the residual material to produce a fired material, wherein
the heating of the residual material takes place at a temperature of >800° C., wherein at least prior to heating of the residual material or prior to heating of the material mixture, an addition of water takes place for the formation of intermediate products containing hydrate phases.
2. The method of claim 1, wherein
the residual material comprises water treatment residues.
3. The method according to claim 1, wherein
the residual material has an X-ray amorphous content of more than 80 wt. %.
4. The method according to claim 1, wherein
the processing of the residual material comprises the removal of water.
5. The method according to claim 1, wherein
the processing of the residual material comprises comminution.
6. The method according to claim 1, wherein
the processing of the residual material takes place in such a way that a residual content of organic material remains in the residual material as a fuel source.
7. The method according to claim 1, wherein
in addition, a source of calcium ions is added before the residual material is heated in order to produce a mixture of materials with calcium.
8. The method according to claim 1, wherein
a source of sulphate ions is additionally added before the residual material is heated in order to produce a mixture of materials with sulphate.
9. The method according to claim 1, wherein
the components
1) of a residual material,
2) a source of calcium ions, and
3) a source of sulphate ions are in the following weight ratios:
Component 1 at 10.0-100.0 wt. %, component 2 at 0.0-90.0 wt. % and component 3 at 0.0 90.0 wt. % based on the dry content of the sum of the weight of components 1, 2 and 3 wherein the source of calcium ions and the source of sulphate ions are added before the residual material is heated.
10. The method according to claim 1, wherein
additionally a processing of the hydrate phase-containing intermediate products is provided.
11. The method according to claim 1, wherein
a compacting of the residual material is provided for minimizing the proportion of fine material.
12. The method according to claim 7, wherein
the heating of the mixture of materials with calcium takes place at a temperature of >800° C.
13. The method of claim 1, wherein
the heating takes place at least in a rotary kiln or in a melting furnace or in an electric arc furnace or in a tub shaft kiln or in a fluid bed thermal calciner.
14. The method according to claim 1, wherein
a preparation of the fired material is provided, wherein the preparation of the fired material comprises shredding.
15. The method according to claim 1, wherein
the preparation of the fired material comprises the addition of additives which are at least grinding aids, ageing inhibitors or anti-dusting agents.

* * * * *